(12) United States Patent
Maruno et al.

(10) Patent No.: US 10,747,507 B2
(45) Date of Patent: *Aug. 18, 2020

(54) DEVELOPMENT SUPPORT DEVICE, DEVELOPMENT SUPPORT METHOD, AND NON-TRANSITORY RECORDING MEDIUM

(71) Applicant: OMRON Corporation, Kyoto (JP)

(72) Inventors: Ryota Maruno, Kyoto (JP); Yuji Suzuki, Kyoto (JP); Yoshimi Niwa, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,354

(22) Filed: Feb. 14, 2019

(65) Prior Publication Data
US 2019/0286423 A1    Sep. 19, 2019

(30) Foreign Application Priority Data
Mar. 15, 2018    (JP) .................................. 2018-048504

(51) Int. Cl.
*G06F 9/44*    (2018.01)
*G06F 8/30*    (2018.01)
(Continued)

(52) U.S. Cl.
CPC ........... *G06F 8/31* (2013.01); *G05B 19/0426* (2013.01); *G05B 19/056* (2013.01); *G06F 8/436* (2013.01);
(Continued)

(58) Field of Classification Search
CPC . G06F 8/31; G06F 8/427; G06F 8/436; G06F 8/447
See application file for complete search history.

(56) References Cited

U.S. PATENT DOCUMENTS

| 7,035,781 B1 * | 4/2006 | Flake .................. G06F 17/5022 703/1 |
| 10,628,143 B2 * | 4/2020 | Niwa ........................ G06F 8/34 |

(Continued)

FOREIGN PATENT DOCUMENTS

| JP | H07072920 | 3/1995 |
| JP | 2003241997 | 8/2003 |

OTHER PUBLICATIONS

"Search Report of Europe Counterpart Application", dated Jan. 28, 2020, p. 1-p. 8.

*Primary Examiner* — Duy Khuong T Nguyen
(74) *Attorney, Agent, or Firm* — JCIPRNET

(57) ABSTRACT

To appropriately find an omission of implementation of a shared variable defined between different programs and an error of a shared variable name before a program is executed. A development support device (50) for developing a plurality of different programming languages that are executed in a control device (10) includes: a shared variable reference (TBL1) which is a pre-created shared variable reference and is referred to in source codes of the plurality of different programming languages, and used for a shared variable that shares a memory; an input unit (71) configured to input the source codes of the plurality of different programming languages; and a determination unit (73d) configured to determine whether the shared variable is referred to in the input source codes of the plurality of different programming languages based on the shared variable reference (TBL1).

5 Claims, 20 Drawing Sheets

(51) Int. Cl.
*G05B 19/042* (2006.01)
*G06F 8/41* (2018.01)
*G05B 19/05* (2006.01)

(52) U.S. Cl.
CPC .... *G05B 2219/23251* (2013.01); *G06F 8/427* (2013.01)

(56) References Cited

U.S. PATENT DOCUMENTS

| | | | |
|---|---|---|---|
| 2004/0010780 A1 | 1/2004 | Garvin | |
| 2007/0118489 A1* | 5/2007 | Gleason | G06F 40/289 706/6 |
| 2010/0005453 A1* | 1/2010 | Argue | G06F 8/10 717/121 |
| 2014/0123104 A1 | 5/2014 | Frohberger et al. | |

* cited by examiner

| Global variable × | | | | | | | | | |
|---|---|---|---|---|---|---|---|---|---|
| Name | Data type | Initial value | Variable sharing | Shared variable check | Allocation destination | Hold | Constant | Publish network | Comment |
| reqHandClose | BOOL | | ☑ | ☑ | | ☐ | ☐ | Private | |
| reqHandOpen | BOOL | | ☑ | ☑ | | ☐ | ☐ | Private | |

TBL1

FIG. 10

| Global variable | × | | | | | | | | |
|---|---|---|---|---|---|---|---|---|---|
| Name | Data type | Initial value | Variable sharing | Shared variable check | Allocation destination | Hold | Constant | Publish network | Comment |
| presValue | INT | | ☑ | ☑ | | ☐ | ☐ | Private | |

TBL2

FIG. 15

| Variable name | Location of use |
|---|---|
| shared1 | Program0, Program2 |
| shared2 | Program0 |
| shared3 | Program1 |
| shared4 | Program1, Program2 |
| shared5 |  |
| in1 | Program0 |
| in2 | Program0 |

V+ language

```
//Declare shared variable
SGLOBAL BOOL reqHandClose

//Move robot arm
APPRO pickWork.loc, 50
SPEED 10
MOVES pickWork.loc
BREAK reqHandClose = TRUE //Wait until picking up of
workpiece is completed
WHILE reqHandClose DO
END //Move robot arm
DEPART 50
MOVES waitPlace.loc
```

IEC language

```
//Control end effector
IF reqHandClose = TRUE THEN
    HandControlEx := TRUE;
    HandControlDist := 40
    IF HandControlDone = TRUE THEN
        reqHandClose := FALSE;
    END_IF
END_IF //MC_MoveRelative
HandControl(
    Axis := MC_Axis000,
    Execute := HandControlEx,
    Distance := HandControlDist,
    Velocity := 100,
    Acceleration := 10000,
    Deceleration := 10000,
    Done => HandControlDone
```

FIG. 24

Cross reference window

Reference target: Robot hand control. reqHandClose

| Setting item | Occurrence location | Detailed information | Reference |
|---|---|---|---|
| reqHandClose | Robot hand control | 2 | IF doHandClose = TRUE THEN <Str |
| reqHandClose | Robot hand control | 7 | IF doHandClose = TRUE THEN <Str |
| reqHandClose | Robot control | 2 | IF reqHandClose = TRUE THEN <Str |
| reqHandClose | Robot control | 7 | IF reqHandClose = TRUE THEN <Str |

FIG. 26

DEVELOPMENT SUPPORT DEVICE, DEVELOPMENT SUPPORT METHOD, AND NON-TRANSITORY RECORDING MEDIUM

CROSS-REFERENCE TO RELATED APPLICATION

This application claims the priority of Japan patent application serial no. 2018-048504, filed on Mar. 15, 2018. The entirety of the above-mentioned patent application is hereby incorporated by reference herein and made a part of this specification.

BACKGROUND

Technical Field

The disclosure relates to a development support device, a development support method, and a development support program for developing a plurality of different programming languages that are executed in a control device.

Description of Related Art

In a system configured to control a robot, a program used for robot control is created in, for example, a V+ language, and a program used for sequence control is created in, for example, a programming language composed of one or a plurality of instructions described according to International Standard IEC61131-3 defined according to the International Electrotechnical Commission (IEC) (hereinafter referred to as an IEC language).

In order to build an application for a robot using such programs, it is necessary to perform an interlock process for exchanging data between two programs and adjusting a timing, or share data that should be acquired in one language with another language.

In the related art, as in Patent Document 1, a processor that executes a program used for robot control and a processor that executes a program used for a sequence control are bus-connected by a shared memory, and data is exchanged between the two programs.

In the two programs, such data exchange is performed by defining shared variables with the same name in each program.

[Patent Document 1] Japanese Unexamined Patent Application Publication No. H7-72920

However, programs in two languages are created on different screens, and generally, created by different persons. Thus, it is assumed that, when implementation of a shared variable taken as an interface between the programs in two languages is forgotten or a shared variable name is erroneously implemented, the two programs do not function properly.

SUMMARY

A development support device of the disclosure, for developing a plurality of different programming languages that are executed in a control device, includes: a shared variable reference which is a pre-created shared variable reference and is referred to in source codes of the plurality of different programming languages, and used for a shared variable that shares a memory; an input unit configured to input the source codes of the plurality of different programming languages; and a determination unit configured to determine whether the shared variable is referred to in the input source codes of the plurality of different programming languages based on the shared variable reference.

A development support method of the disclosure, for developing a plurality of different programming languages that are executed in a control device, includes: a step of inputting source codes of the plurality of different programming languages; and a step of determining whether a shared variable is referred to in the input source codes of the plurality of different programming languages based on a shared variable reference which is a pre-created shared variable reference and is referred to in the source codes of the plurality of different programming languages, and used for the shared variable that shares a memory.

A non-transitory recording medium storing a development support program of the disclosure causes a computer to execute the above development support method.

BRIEF DESCRIPTION OF THE DRAWINGS

FIG. 10 is a diagram showing an example of a global variable table displayed on a reference information display unit.

FIG. 15 is a diagram showing an example of a global variable table.

FIG. 24 is a diagram showing an example of a source code of a program written in a V+ language and a source code of a program written in an IEC language displayed on a program display unit.

FIG. 26 is a diagram showing an example of a cross reference window.

DESCRIPTION OF THE EMBODIMENTS

Figure 1:
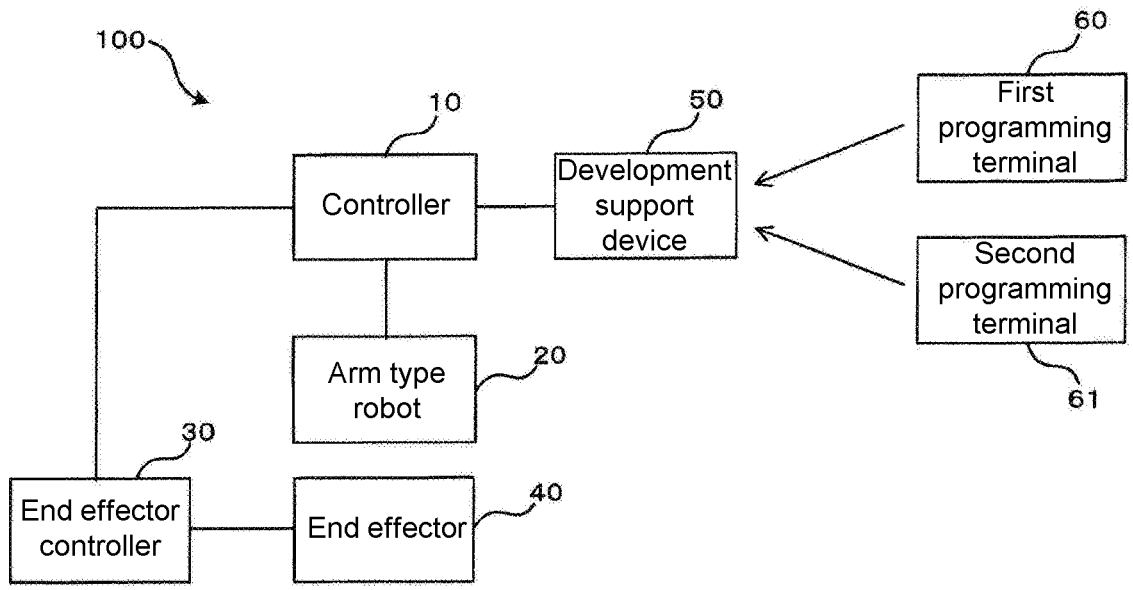
FIG. 1 is a block diagram showing a schematic configuration of a robot control system 100 in a first embodiment.

Here, an embodiment of the disclosure provides a development support device, a development support method, and a development support program through which it is possible to appropriately find an omission of implementation of a shared variable defined between different programs and an error of a shared variable name before a program is executed.

A development support device of the disclosure, for developing a plurality of different programming languages that are executed in a control device, includes: a shared variable reference which is a pre-created shared variable reference and is referred to in source codes of the plurality of different programming languages, and used for a shared variable that shares a memory; an input unit configured to input the source codes of the plurality of different programming languages; and a determination unit configured to determine whether the shared variable is referred to in the input source codes of the plurality of different programming languages based on the shared variable reference.

In the above development support device, when a shared variable that is referred to in source codes of a plurality of different programming languages and shares a memory is defined, a shared variable reference for the shared variable is created. The shared variable reference may be input to the development support device, or may be stored in an external device that the development support device can access.

The source codes of the plurality of different programming languages are created in a device different from the development support device, and are input to the development support device by the input unit of the development support device.

The determination unit of the development support device refers to the shared variable reference, reads the shared variable, and determines whether the shared variable is referred to in the input source codes of the plurality of different programming languages.

According to the above development support device, since it is determined whether a shared variable is referred to in source codes of a plurality of different programming languages based on the shared variable reference, it is possible to appropriately find an omission of implementation of the shared variable defined between different programs and an error of a shared variable name before a program is executed.

The development support device according to one embodiment further includes an error message output unit configured to output an error message. When it is determined that the shared variable is referred to in a source code of one programming language among the source codes of the plurality of different programming languages, the determination unit determines whether the shared variable referred to is referred to in a source code of another programming language. When it is determined that the shared variable is not referred to, the determination unit outputs a notification indicating an error state. The error message output unit outputs an error message when the determination unit outputs the notification indicating the error state.

In the development support device of the one embodiment, the determination unit determines whether the shared variable is referred to in a source code of one programming language among the source codes of the plurality of different programming languages. When it is determined that the shared variable is referred to in the source code of the one programming language, it is determined whether the shared variable referred to is referred to in a source code of another programming language. As a result, when it is determined that the shared variable is not referred to, a notification indicating an error state is output and an error message is output.

According to the above development support device, it is possible to appropriately find an omission of implementation of a shared variable defined between different programs and an error of a shared variable name before a program is executed.

The development support device according to one embodiment further includes an error message output unit configured to output an error message. When it is determined that the shared variable is not referred to in a source code of any programming language among the source codes of the plurality of different programming languages or when it is determined that the shared variable is referred to only in a source code of any programming language, the determination unit outputs a notification indicating an error state. The error message output unit outputs an error message when the determination unit outputs the notification indicating the error state.

In the development support device of the one embodiment, the determination unit determines whether the shared variable is referred to in the source codes of the plurality of different programming languages. When it is determined that the shared variable is not referred to in a source code of any programming language, a notification indicating an error state is output and an error message is output. In addition, when it is determined that the shared variable is referred to only in a source code of one programming language, a notification indicating an error state is output and an error message is output.

According to the above development support device, it is possible to check for an omission of implementation of a shared variable, an error of a shared variable name, the presence of a useless shared variable, and the like, and it is possible to smoothly debug the program.

The development support device according to one embodiment further includes: a display unit configured to display at least one of the source codes of the plurality of different programming languages, and outlines of the source codes; a selection unit configured to select the shared variable displayed on the display unit; and a reference unit configured to, when the determination unit determines that the shared variable is referred to, display a location in which the shared variable is referred to in the source code. When the selection unit selects the shared variable in a source code or an outline of one programming language among the source codes or the outlines of the plurality of different programming languages displayed on the display unit, the determination unit determines whether the shared variable is referred to in the source code of the one programming language and a source code of another programming language.

In the development support device of the one embodiment, the determination unit determines whether a shared variable is selected by the selection unit in a source code or outline of one programming language among source codes or outlines of a plurality of different programming languages displayed on the display unit. As a result of determination, when the shared variable is selected, it is determined whether the shared variable is referred to not only in the source code of the one programming language but also a source code of another programming language.

According to the above development support device, it is possible to easily check whether the shared variable is properly referred to in all programs. As a result, it is possible to check for an omission of implementation of a shared variable, an error of a shared variable name, the presence of a useless shared variable, and the like, and it is possible to smoothly debug the program.

A development support method of the disclosure, for developing a plurality of different programming languages that are executed in a control device, includes: a step of inputting source codes of the plurality of different programming languages; and a step of determining whether a shared variable is referred to in the input source codes of the plurality of different programming languages based on a shared variable reference which is a pre-created shared variable reference and is referred to in the source codes of the plurality of different programming languages, and used for the shared variable that shares a memory.

According to the development support method of the disclosure, it is possible to appropriately find an omission of implementation of a shared variable defined between different programs and an error of a shared variable name before a program is executed.

A non-transitory recording medium storing a development support program of the disclosure causes a computer to execute the above development support method.

When the program of the disclosure is executed in a computer, the above development support method can be performed.

As can be clearly understood from the above, according to the development support device, the development support method and the development support program of the disclosure, since it is determined whether the shared variable is referred to in source codes of a plurality of different programming languages based on the shared variable reference, it is possible to appropriately find an omission of implementation of a shared variable defined between different programs and an error of a shared variable name before a program is executed.

Embodiments of the disclosure will be described below in detail with reference to the drawings.

First Embodiment

FIG. 1 is a block diagram showing a schematic configuration of a robot control system 100 in a first embodiment. As shown in FIG. 1, the robot control system 100 includes a controller (control device) 10, an arm type robot 20, an end effector controller 30, an end effector 40, and a development support device 50.

The controller 10 is, for example, a programmable logic controller (PLC), and executes a robot control program that controls operations of the arm type robot 20 and a sequence control program that controls operations of the end effector 40, and outputs a control signal.

The arm type robot 20 is, for example, a 6-axis vertical articulated robot, and is communicatively connected to the controller 10. The arm type robot 20 has a power source such as a servomotor, and drives a servomotor according to a control signal output from the controller 10 based on a robot control program, and operates joint axes.

The end effector controller 30 is communicatively connected to the controller 10. The end effector controller 30 drives a servomotor in the end effector 40 according to a control signal output from the controller 10 based on the sequence control program.

The end effector 40 is attached to a tip of the arm type robot 20 and includes, for example, a mechanism that grips a component. The end effector 40 is communicatively connected to the end effector controller 30, and drives a servomotor in the end effector 40 based on a control signal output from the end effector controller 30, and performs an operation of gripping a component and the like.

The development support device 50 is, for example, a computer such as a personal computer, and is communicatively connected to the controller 10. The development support device 50 has a function of downloading a robot control program and a sequence control program executed in the controller 10 to the controller 10, a function of debugging these programs, a function of simulating these programs, and the like.

In the present embodiment, the development support device 50 is communicatively connected to a first programming terminal 60 and a second programming terminal 61. The robot control program is created by the first programming terminal 60 such as a personal computer, and is downloaded to the development support device 50. In addition, the sequence control program is created by the second programming terminal 61 such as a personal computer and is downloaded to the development support device 50. In addition, the robot control program and the sequence control program may be created in the development support device 50.

Figure 2:
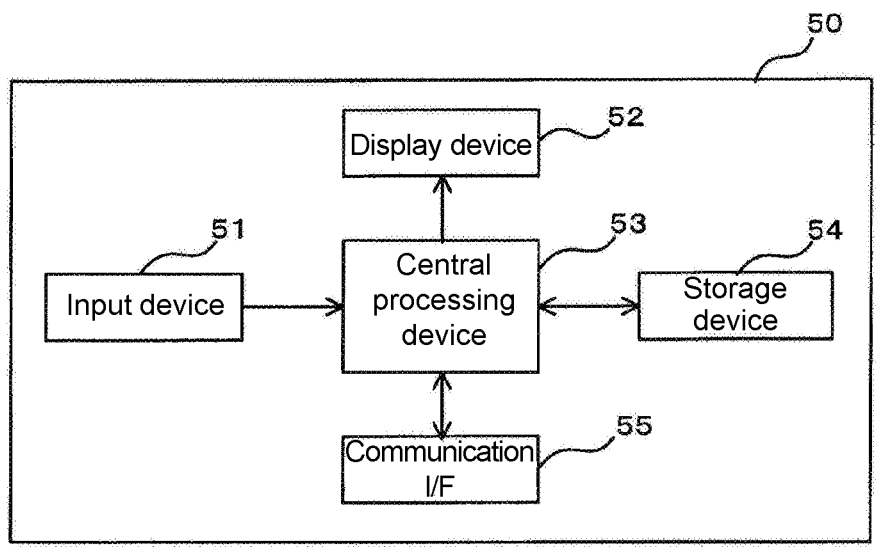
FIG. 2 is a diagram showing a hardware configuration of a development support device.

The development support device 50 activates software that is installed in advance in a computer and thus realizes the above functions. A development support program of the disclosure is included in this software. As shown in FIG. 2, a hardware configuration of the development support device 50 includes an input device 51, a display device 52, a central processing device 53, a storage device 54, and a communication I/F (interface) 55. The input device 51 includes, for example, a keyboard and a pointing device. The display device 52 includes, for example, a display. The central processing device 53 includes, for example, a CPU (Central Processing Unit). The storage device 54 includes a non-volatile storage device and a volatile storage device. The non-volatile storage device stores outline information, cross reference information, a global variable table, and the like to be described below in addition to the robot control program and the sequence control program. In addition, the volatile storage device is appropriately used as a work memory when the central processing device 53 is executed. The communication I/F 55 is, for example, a serial line interface such as RS232C, and performs communication with the controller 10. The communication I/F 55 may be another communication line interface.

Figure 3:
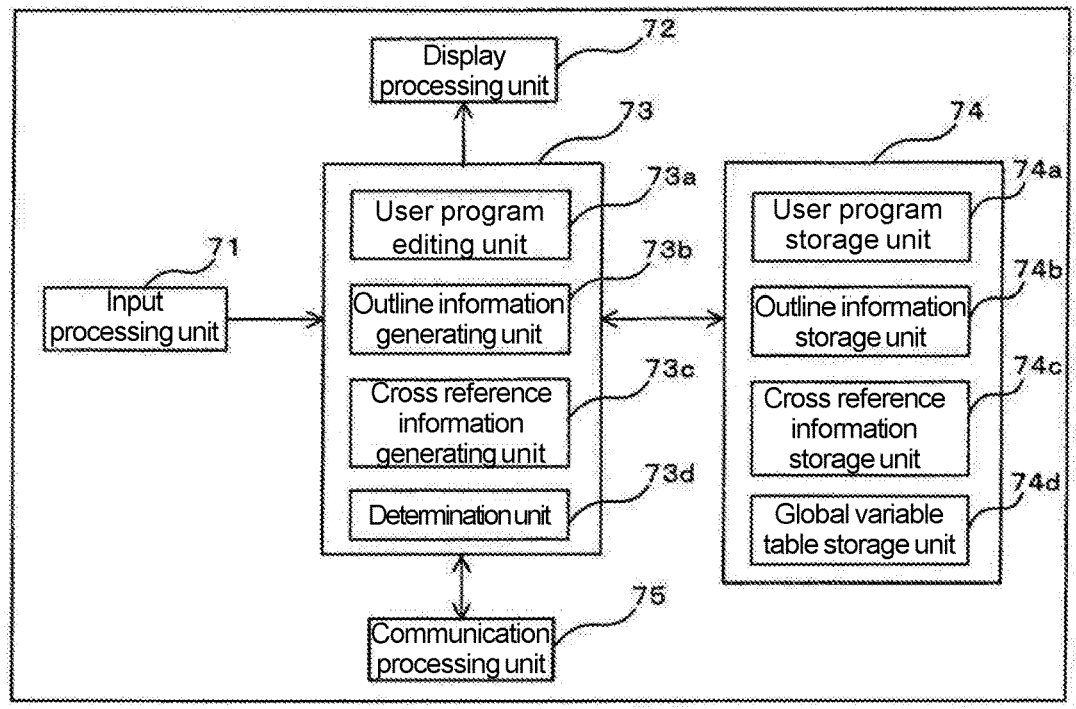
FIG. 3 is a functional block diagram of the development support device.

FIG. 3 is a functional block diagram of the development support device 50 in the present embodiment. The development support device 50 functions as an input processing unit 71, a display processing unit 72, an operation unit 73, a storage unit 74, and a communication processing unit 75. The input processing unit 71 processes an input from the input device 51. The display processing unit 72 creates display data output to the display device 52. The operation unit 73 includes a user program editing unit 73a, an outline information generating unit 73b, a cross reference information generating unit 73c, and a determination unit 73d. Details of such functions of the operation unit 73 will be described below. The storage unit 74 includes a user program storage unit 74a, an outline information storage unit 74b, a cross reference information storage unit 74c, and a global variable table storage unit 74d. Details of such storage units will be described below.

Figure 4:
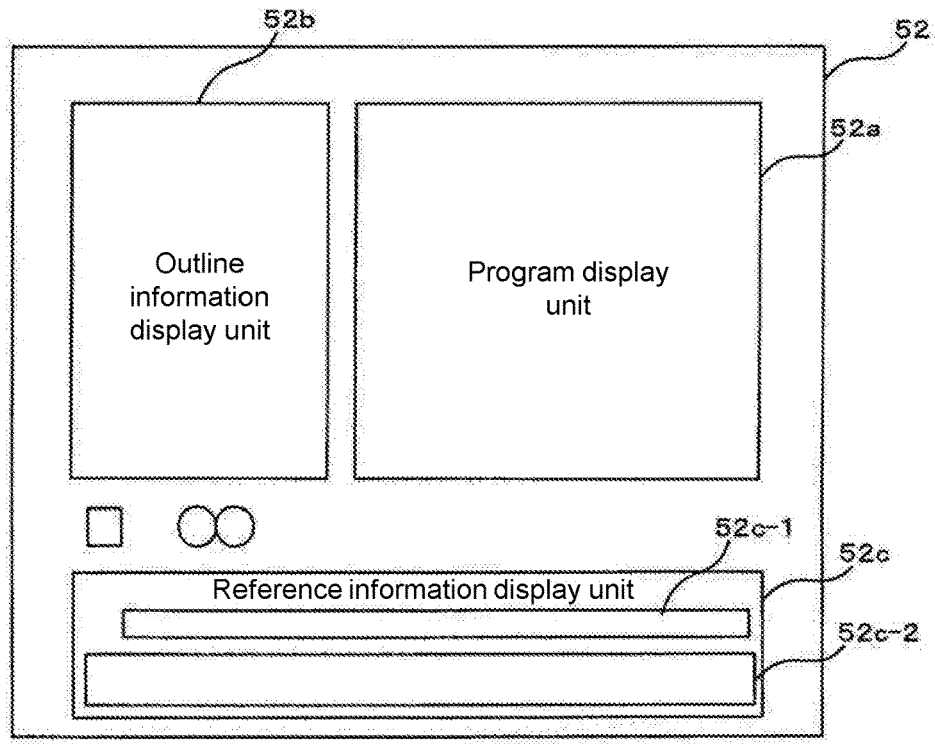
FIG. 4 is a diagram showing a display screen displayed on a display device.

FIG. 4 shows a display screen displayed on the display device 52. As shown in FIG. 4, a display screen of the display device 52 includes a program display unit 52a, an outline information display unit 52b, and a reference information display unit 52c. The program display unit 52a displays a source code of a robot control program and a sequence control program. The outline information display unit 52b displays outline information indicating a configuration of the robot control program and the sequence control program.

Outline information to be displayed on the outline information display unit 52b is created by the outline information generating unit 73b and stored in the outline information storage unit 74b in the storage unit 74. Then, the display processing unit 72 displays outline information about the robot control program and the sequence control program displayed on the program display unit 52a in the outline information display unit 52b.

The outline information is information indicating an outline of a configuration of the robot control program and the sequence control program, and is obtained by extracting predetermined components used in the robot control program and the sequence control program in order from the beginning of the program.

The reference information display unit 52c includes a reference target input field 52c-1 and a reference information display field 52c-2. By inputting an operand to the reference target input field 52c-1, cross reference information about an instruction having the same operand as the operand is displayed on the reference information display field 52c-2. In addition, by inputting a shared variable to the reference target input field 52c-1, cross reference information about an instruction that uses the shared variable is displayed on the reference information display field 52c-2.

In the present embodiment, variable names can be assigned to correspond to a contact number and a memory number corresponding to the operand of the instruction, and the program can be edited using the variable names. Operands can be displayed using variable names on the program display unit 52a, the outline information display unit 52b, and the reference information display unit 52c. Of course, a contact number and a memory number may be used for display without using such variable names.

In the present embodiment, it is possible to check a shared variable referred to in both the robot control program and the sequence control program. When a shared variable is checked, the shared variable is input to the reference target input field 52c-1 of the reference information display unit 52c, and thus cross reference information is displayed on the reference information display field 52c-2. Details will be described below.

Next, a shared variable check process in the present embodiment will be described. In the present embodiment, as an example, a shared variable check process in a program when an arm type robot is moved to a position of a workpiece, the workpiece is gripped by an end effector, and the arm type robot is moved to another position in that state will be described. In the robot control program, a V+ language is used in the present embodiment. The sequence control program is a program written in an IEC language, and in the present embodiment, for example, an ST (structured text) language is used.

Figure 5:
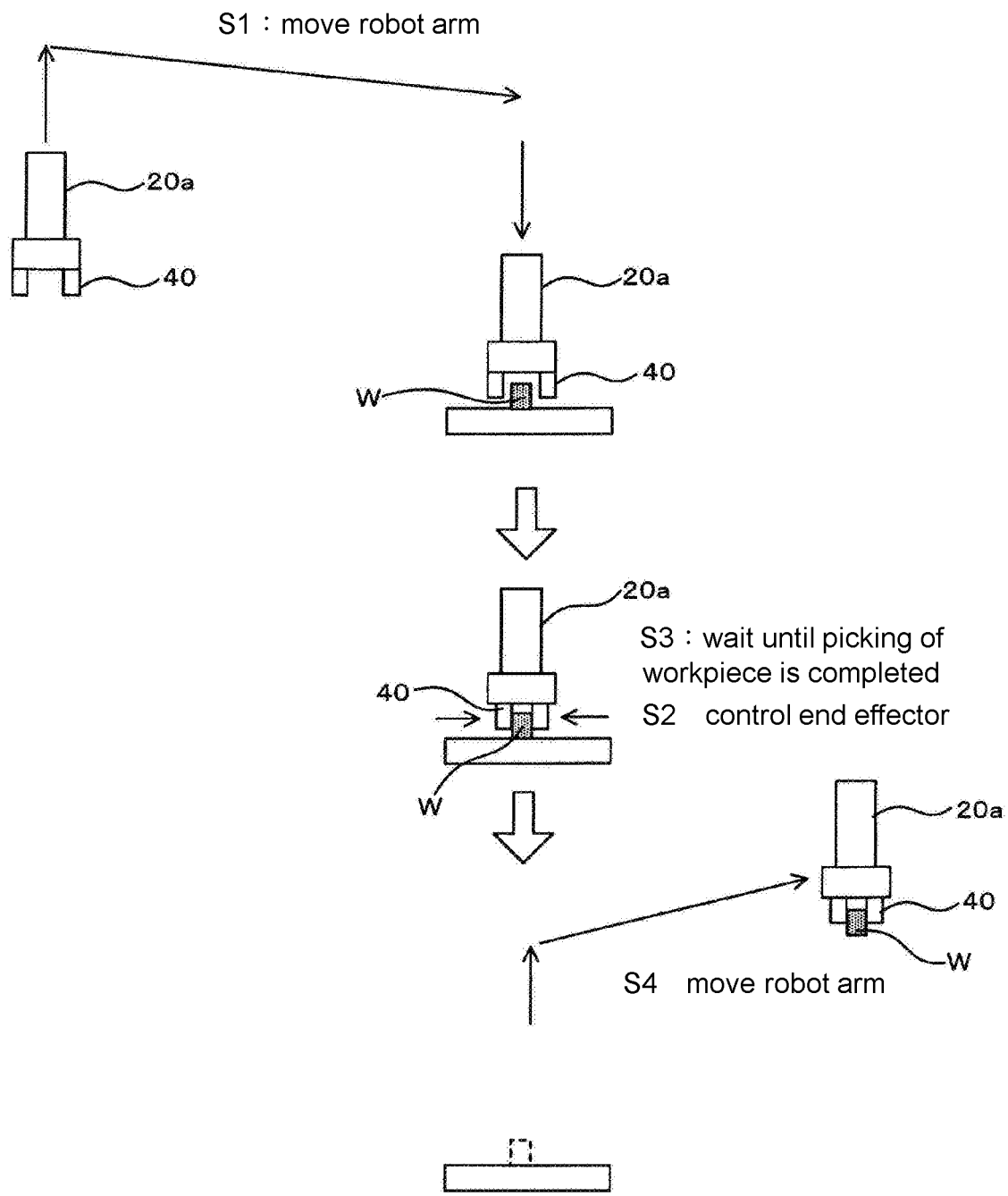
FIG. 5 is a diagram explaining operations of an arm type robot and an end effector.
Figure 6:
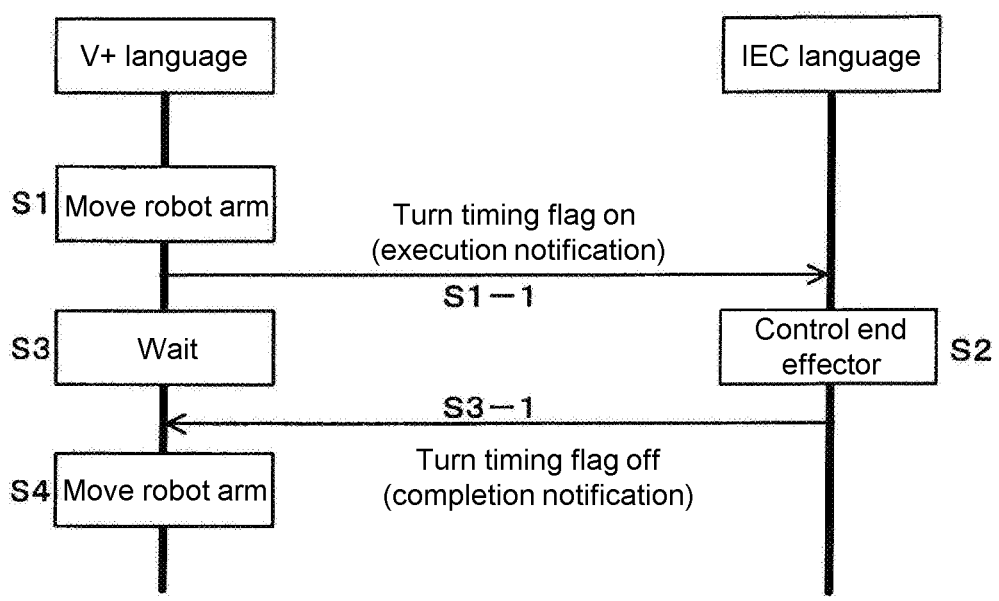
FIG. 6 is a flowchart of a program written in a V+ language and a program written in an IEC language for realizing operations shown in FIG. 5.
Figure 7:
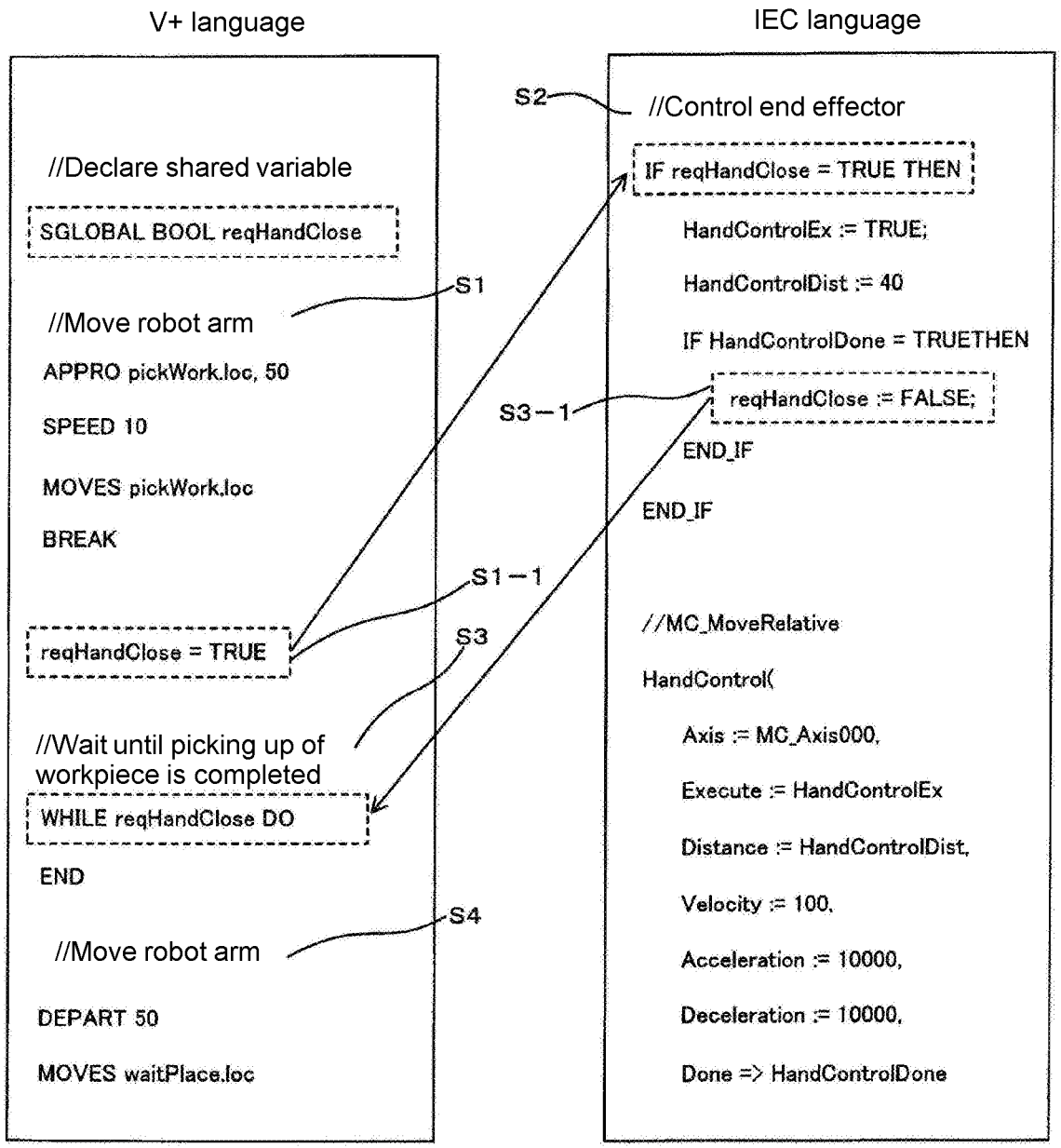
FIG. 7 is a diagram showing a program written in a V+ language and a program written in an IEC language for realizing operations shown in FIG. 5.

FIG. 5 is a diagram explaining the above operations of an arm type robot and an end effector. FIG. 6 is a flowchart of a program written in a V+ language and a program written in an IEC language for realizing the above operations. FIG. 7 is a diagram showing a source code of a program written in a V+ language and a program written in an IEC language for realizing the above operations.

In this example, as shown in FIG. 5, first, an arm 20a of the arm type robot 20 is moved close to the workpiece W (step S1: move robot arm). Next, the end effector 40 is moved and thus the workpiece W is picked up by the end effector 40 (step S2: control end effector). During this time, the arm type robot 20 waits until picking of the workpiece W is completed (step S3: wait until picking of the workpiece is completed). Then, when picking of the workpiece W is completed, the arm 20a of the arm type robot 20 is moved to another position (step S4: move robot arm).

The above operations will be described with reference to the flowchart in FIG. 6. As shown in FIG. 6, in a program written in a V+ language which is a robot control program, first, the arm 20a of the arm type robot 20 is moved to a predetermined position near the workpiece W (step S1). Next, when movement of the arm 20a of the arm type robot 20 to a predetermined position is completed, a timing flag is turned ON using a shared variable (step S1-1). This shared variable is referred to also in a program written in an IEC language and turning the timing flag ON is a notification that control of the end effector is executed for the program written in an IEC language.

When the timing flag is turned ON, the program written in an IEC language starts control of the end effector 40 to pick up the workpiece W (step S2). During this time, the program written in a V+ language waits (step S3). When picking of the workpiece W by the end effector 40 is completed, the program written in an IEC language turns the timing flag OFF using a shared variable (step S3-1). Turning the timing flag OFF is a notification that control of the end effector is completed for the program written in a V+ language. When the timing flag is turned OFF, the program written in a V+ language moves the arm 20a of the arm type robot 20 to another position (step S4).

In the example shown in FIG. 7, reqHandClose is used as a shared variable, and reqHandClose is referred to both in the program written in a V+ language and the program written in an IEC language. The statement reqHandClose=TRUE indicates that the timing flag is turned ON, and the statement reqHandClose=FALSE indicates that the timing flag is turned OFF.

As described above, in the present embodiment, when a shared variable called reqHandClose is checked between the program written in a V+ language and the program written in an IEC language, operations of the arm type robot 20 and the end effector 40 are controlled. Thus, when any of the programs forgets to use a shared variable called reqHandClose or uses a shared variable with a name different from reqHandClose, the program stops at that time, and the arm type robot 20 and the end effector 40 do not perform a desired operation.

Figure 8:
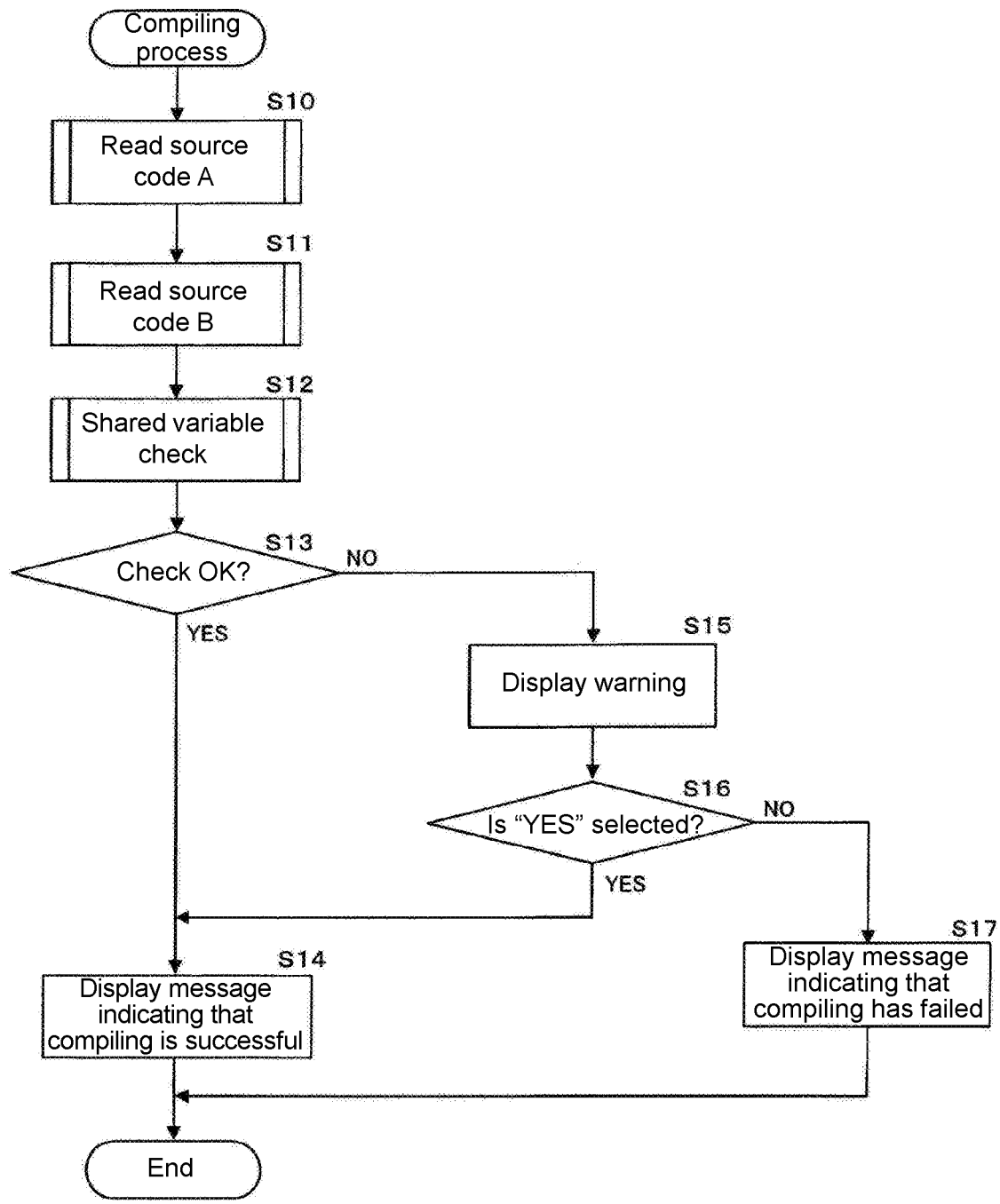
FIG. 8 is a flowchart showing a flow of a shared variable check process.
Figure 9:
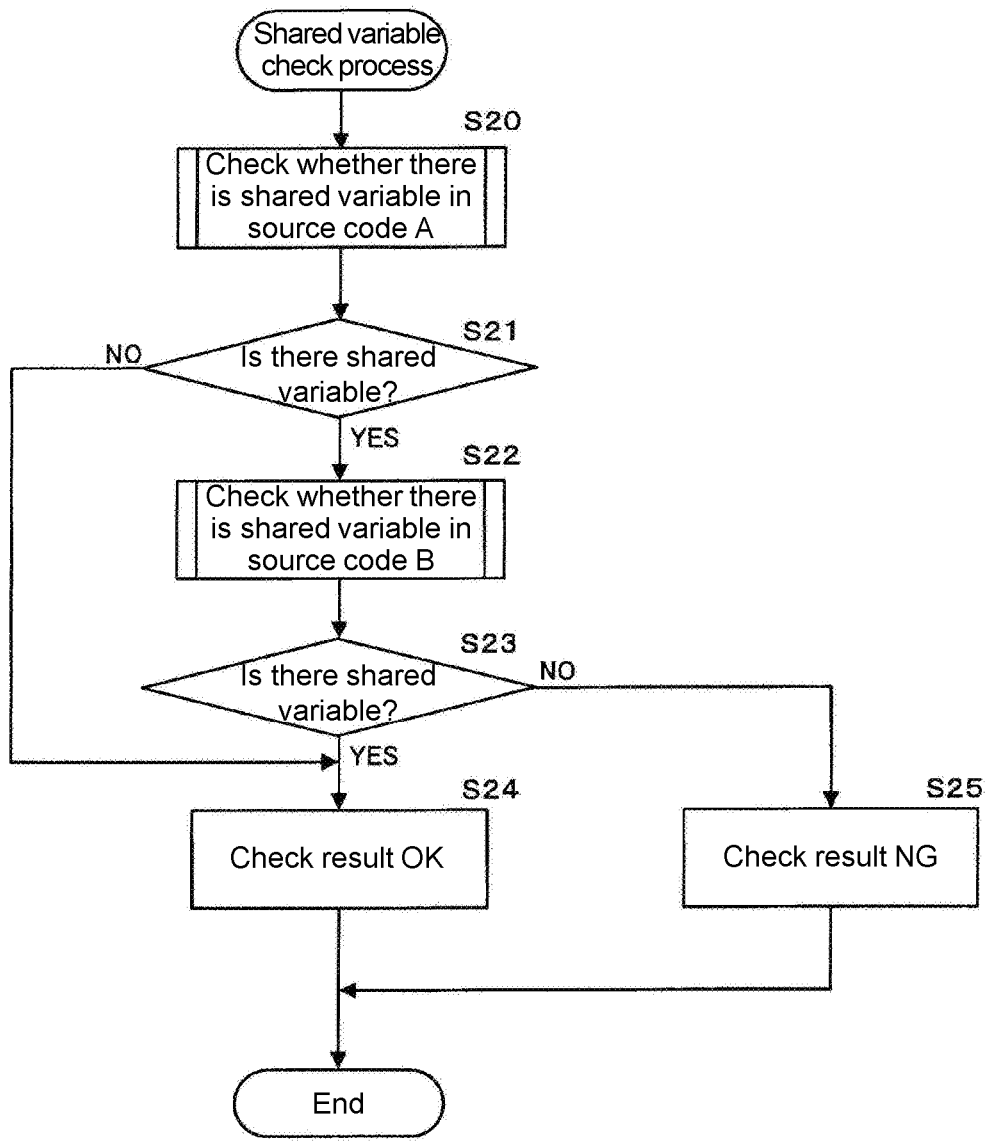
FIG. 9 is a flowchart showing a flow of a shared variable check process.

Thus, in the present embodiment, in order to prevent implementation errors of such shared variables, a shared variable check process is performed when the program written in an IEC language is subjected to a compiling process. FIG. 8 and FIG. 9 are a flowchart showing a flow of a shared variable check process in the present embodiment.

In FIG. 8, steps necessary for the compiling process other than the shared variable check process are not described. When a program written in a V+ language and a program written in an IEC language are downloaded to the development support device 50 and a compiling process starts, the input processing unit 71 of the development support device 50 reads a source code A (step S10), and reads a source code B (step S11). In this example, the source code of the program written in a V+ language is set as the source code A and the source code of the program written in an IEC language is set as the source code B.

When the source code A and the source code B are completely read, the determination unit 73d performs a shared variable check process (step S12). FIG. 9 is a flowchart showing subroutines of the shared variable check process. As shown in FIG. 9, the central processing device 53 first checks whether there is a shared variable in the source code A. A global variable table TBL1 shown in FIG. 10 is used to check whether there is a shared variable.

In the present embodiment, the global variable table TBL1 is created when a program is created in an IEC language in the second programming terminal 61, and is downloaded together when the program written in an IEC language is downloaded to the development support device 50.

When a shared variable is checked, it is necessary to register the shared variable in advance in the global variable table TBL1 displayed on the program display unit 52a.

As shown in FIG. 10, the global variable table TBL1 includes a field indicating a name of a shared variable, a field indicating a data type, a field indicating whether a variable is shared, a field indicating whether a shared variable is checked, and the like. The field indicating whether a variable is shared and the field indicating whether a shared variable is checked are provided in consideration of reserving a shared variable that may be used later.

In the example shown in FIG. 10, in the variable reqHandClose, a checkbox in the field indicating whether a variable is shared is checked and a checkbox in the field indicating whether a shared variable is checked is checked. The central processing device 53 reads the shared variable reqHandClose from the global variable table TBL1, and checks whether the shared variable is described in the source code A, that is, the source code of the program written in an V+ language (step S20). In this example, it is checked whether the shared variable reqHandClose is described.

When it is determined that there is no shared variable in the source code B (NO in step S21) as a result of checking, the determination unit 73d sets a check result to OK (step S24), and exits the subroutine. In the example shown in FIG. 7, since the shared variable reqHandClose is described in the source code of the program written in an IEC language, the determination unit 73d determines that there is a shared variable in the source code B (YES in step S21). Next, it is checked whether a shared variable is described in the source code A, that is, the source code of the program written in a V+ language (step S22). In this example, it is checked whether the shared variable reqHandClose is described. In the example shown in FIG. 7, since the shared variable reqHandClose is described in the source code of the program written in a V+ language, the determination unit 73d determines that there is a shared variable in the source code A (YES in step S23). In this case, the determination unit 73d sets a check result to OK (step S24), and exits the subroutine. However, when it is determined that there is no shared variable in the source code A (NO in step S23), the determination unit 73d sets a check result to NG (S25), and exits the subroutine.

As shown in FIG. 8, when a result of shared variable checking (step S12) is that the check result is OK (YES in step S13), the central processing device 53 displays a message indicating that compiling is successful on a screen of the display device 52 of the development support device 50 (step S14). However, when a result of shared variable checking (step S12) is that the check result is NG (NO in step S13), the central processing device 53 displays an error message box M1 as shown in FIG. 11 on a screen of the display device 52 of the development support device 50 (step S15).

Figure 11:
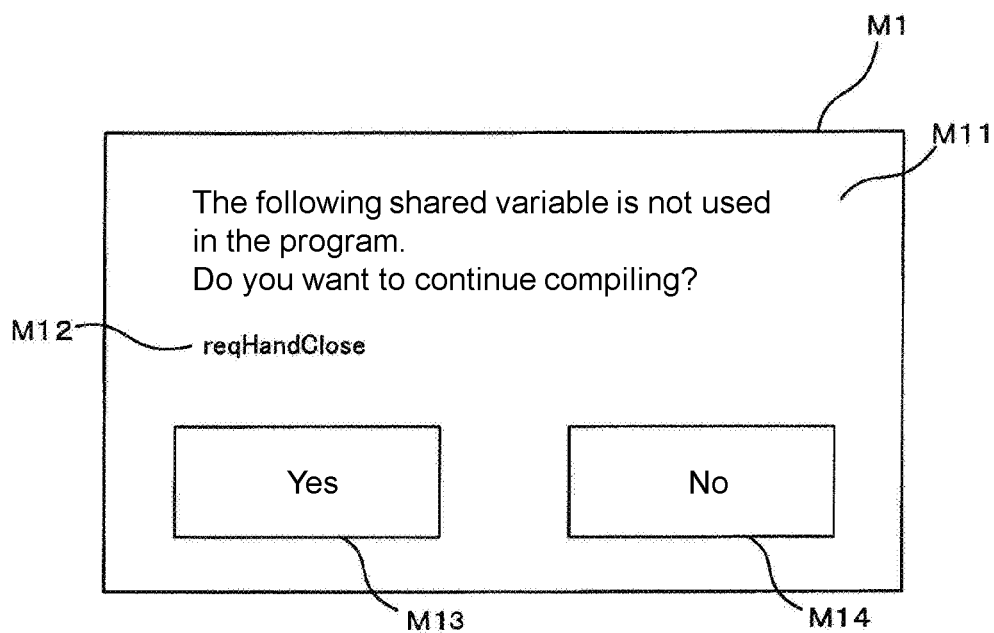
FIG. 11 is a diagram showing an example of an error message box.

FIG. 11 is a diagram showing an example of the error message box M1. As shown in FIG. 11, in the error message box M1, an error message M11, a name M12 of a shared variable of an error object, a "Yes" button M13, and a "No" button M14 are displayed. In the example in FIG. 11, as the error message M11, a message of "The following shared variable is not used in the program. Do you want to continue compiling?" is displayed. As the name M12 of a shared variable of an error object, a name called reqHandClose is displayed.

When a user confirms the error message box M1 and wants to continue compiling, he or she clicks the "Yes" button M13, and when a user wants to stop compiling, he or she clicks the "No" button M14.

As in FIG. 8, when it is determined that the "Yes" button M13 is selected in the error message box M1 (YES in step S16), the determination unit 73d displays a message indicating that compiling is successful on a screen of the display device 52 of the development support device 50 (step S14). However, when it is determined that the "No" button M14 is selected in the error message box M1 (NO in step S16), the determination unit 73d displays a message indicating that compiling has failed on a screen of the display device 52 of the development support device 50 (step S17).

As described above, according to the present embodiment, since a shared variable is checked using a global variable table during a compiling process, it is possible to appropriately find an omission of implementation of a shared variable defined between different programs and a difference of a shared variable name before the program is executed.

While an example in which a global variable table is created when a program is described in an IEC language has been described in the above embodiment, a global variable table may be created when a program is described in a V+ language.

While a form in which the field indicating whether a variable is shared and the field indicating whether a shared variable is checked are provided in the global variable table has been described in the above embodiment, a form in which these fields are not provided may be used.

Second Embodiment

Figures 12A, 12B:
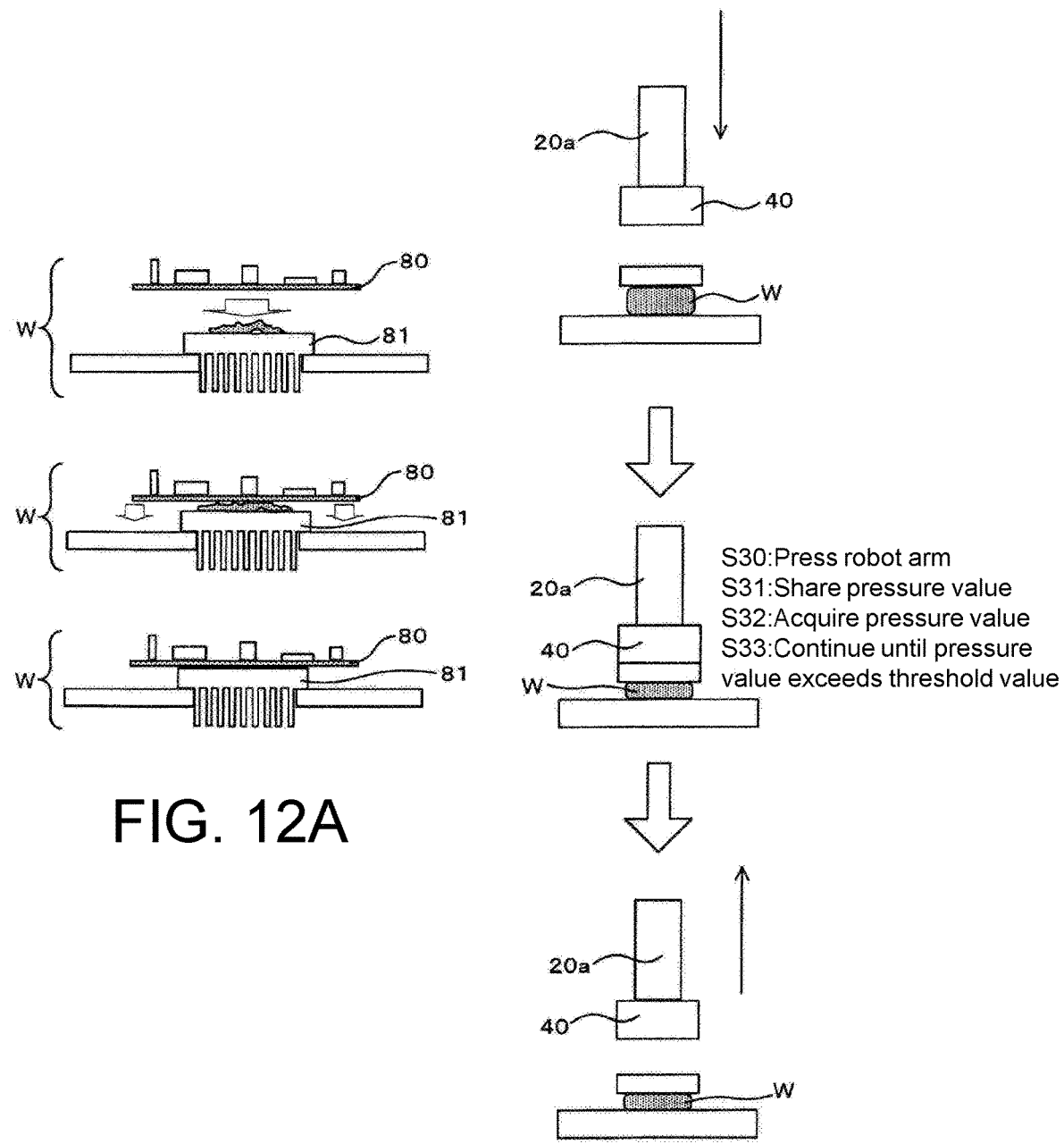
FIG. 12A is a diagram showing a process of attaching a substrate on which a component is mounted to a heatsink.
FIG. 12B is a diagram for explaining such operations when the process of FIG. 12A is executed by an arm type robot and an end effector in a second embodiment.

Next, a second embodiment of the disclosure will be described with reference to the appended drawings. FIG. 12A and FIG. 12B are diagrams explaining operations of an arm type robot and an end effector in the present embodiment. In the present embodiment, a shared variable check process in a program for realizing a pressing operation of an arm type robot will be described.

In this example, as shown in FIG. 12A, in order to attach a substrate 80 on which a component is mounted to a heatsink 81, an operation of pressing the substrate 80 on which a component is mounted against the heatsink 81 is performed by the arm type robot 20.

The end effector 40 in this case includes a force sensor (not shown), and acquires a pressure value during a pressing operation from the force sensor. As shown in FIG. 12B, the end effector 40 including a force sensor is attached to the arm type robot 20.

In order to perform a pressing operation, first, the end effector 40 attached to the arm 20a of the arm type robot 20 is pressed against the workpiece W (step S30: press robot arm). At this time, the force sensor provided in the end effector 40 acquires a pressure value during pressing, the pressure value is assigned to the shared variable, and the pressure value is shared with the arm type robot 20 (step S31: share pressure value). The arm type robot 20 acquires the pressure value using the shared variable (step S32: acquire pressure value), and continues the pressing operation until the pressure value exceeds a threshold value (step S33: continue until the pressure value exceeds a threshold value). When the pressure value exceeds a threshold value, the arm type robot 20 stops the pressing operation and moves away from the workpiece W.

Figure 13:
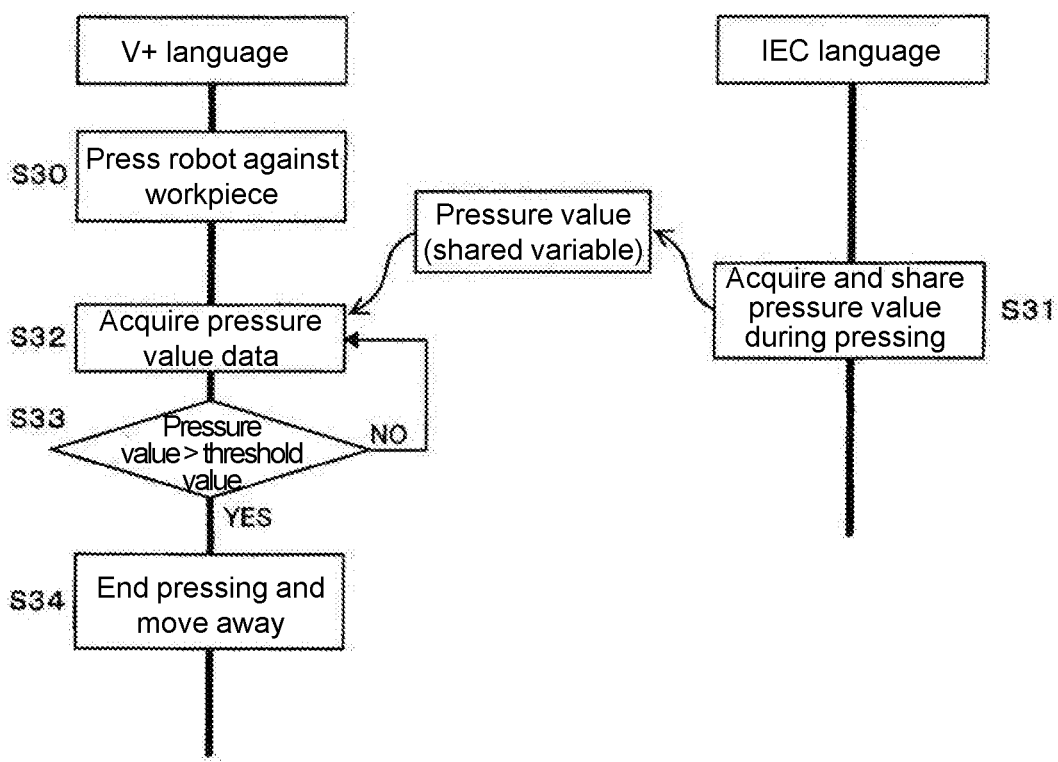
FIG. 13 is a flowchart of a program written in a V+ language and a program written in an IEC language for realizing operations shown in FIG. 12B.

The above operations will be described with reference to the flowchart in FIG. 13. As shown in FIG. 13, in the program written in a V+ language which is a robot control program, the arm 20a of the arm type robot 20 is pressed against the workpiece W (step S30). In the program written in an IEC language, a pressure value during pressing is acquired from the force sensor provided in the end effector 40, the pressure value is assigned to the shared variable, and the pressure value is shared with the arm type robot 20 (step S31). The program written in a V+ language acquires the pressure value using the shared variable (step S32), and continues the pressing operation until the pressure value exceeds a threshold value (step S33). When the pressure value exceeds a threshold value, the program written in a V+ language stops the pressing operation and moves the arm 20a of the arm type robot 20 away from the workpiece W (step S34).

Figure 14:
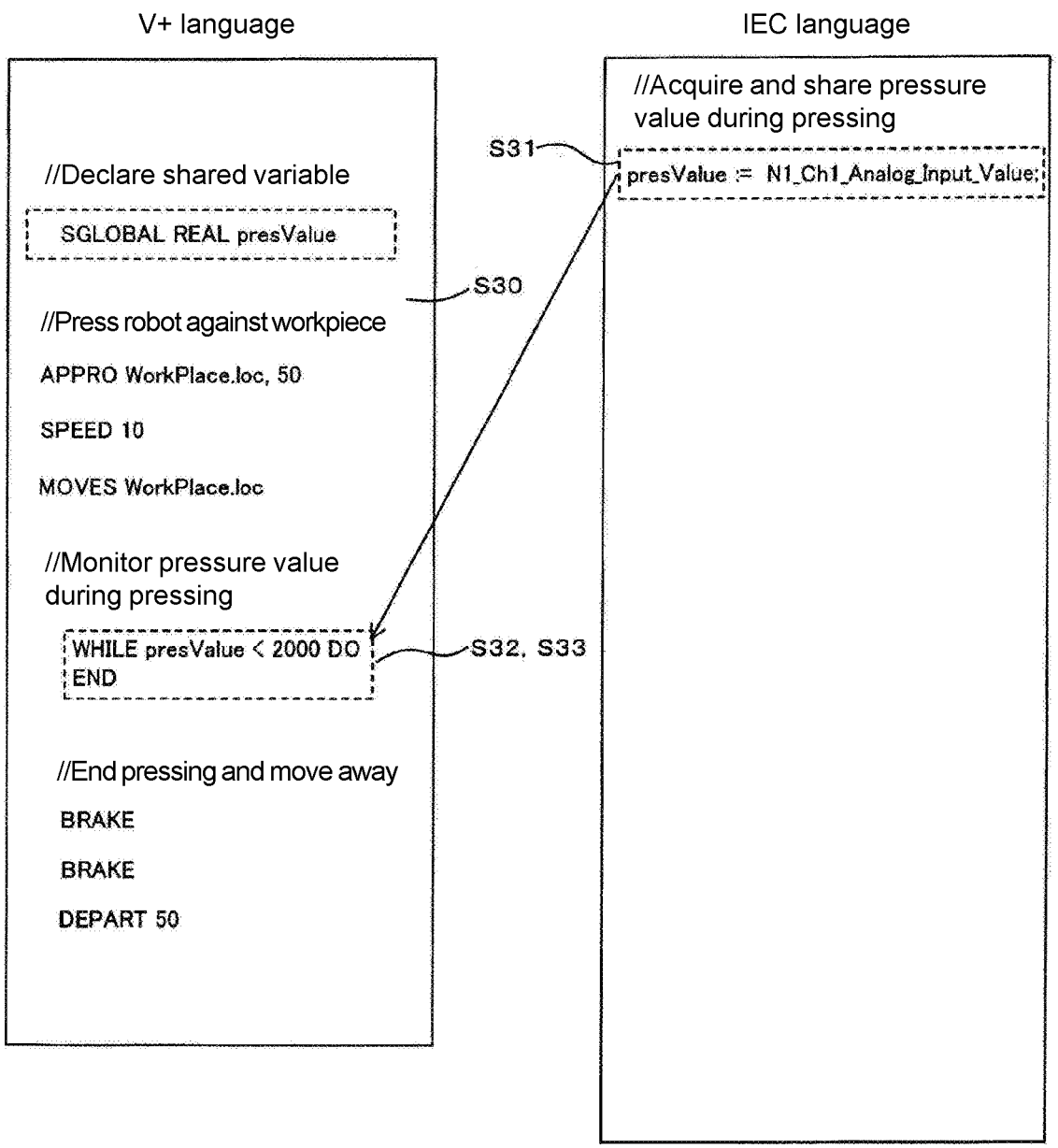
FIG. 14 is a diagram showing an example of a program written in a V+ language and a program written in an IEC language for realizing operations shown in FIG. 12B.

In the example shown in FIG. 14, presValue is used as a shared variable, and presValue is referred to both in the program written in a V+ language and the program written in an IEC language. The statement presValue:=N1_ Ch1_Analog_Input_Value indicates a process of assigning a pressure value to a shared variable in the program written in an IEC language. In addition, the statement WHILE presValue<2000 DO indicates a process of continuing a pressing operation until the pressure value exceeds a threshold value in the program written in a V+ language.

Since the flowchart of the shared variable check process in the present embodiment is the same as the flowchart shown in FIG. 8 and FIG. 9 described in the first embodiment, description thereof will be omitted. However, a global variable table TBL2 shown in FIG. 15 is used to check whether there is a shared variable. In the global variable table TBL2 shown in FIG. 15, presValue is registered as a shared variable.

As described above, according to the present embodiment, since a shared variable is checked using a global variable table during a compiling process, it is possible to appropriately find an omission of implementation of a shared variable defined between different programs and a difference of a shared variable name before the program is executed.

Third Embodiment

Next, a third embodiment of the disclosure will be described with reference to the appended drawings. A form in which the shared variable check process is performed during the compiling process of the program written in an IEC language has been described in the first embodiment and the second embodiment. However, in the present embodiment, after the compiling process is executed, if a shared variable check item 92 is selected, the shared variable check process is performed.

A hardware configuration and a functional block configuration of the development support device 50 in the present embodiment are the same as the hardware configuration and the functional block configuration of the development support device 50 in the first embodiment shown in FIG. 2 and FIG. 3.

Figure 16:
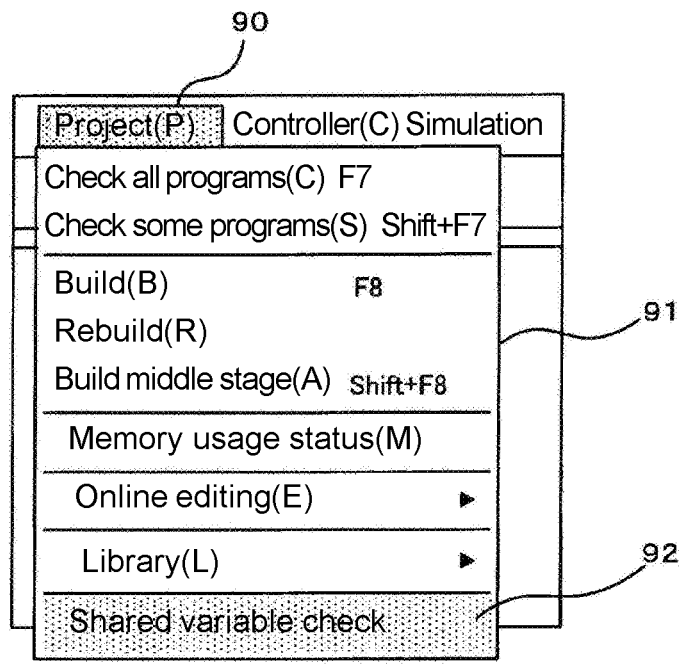
FIG. 16 is a diagram showing an example of a project menu in a third embodiment.

In the present embodiment, as shown in FIG. 16, when a project tab 90 is selected on a screen of the display device 52 of the development support device 50, a project menu 91 is displayed. When the shared variable check item 92 is selected from the project menu 91, the shared variable check process is performed. Here, in the present embodiment, an input of the source code of the program written in a V+ language and the source code of the program written in an IEC language has already been completed, and the compiling process of the program written in an IEC language has already been completed.

Figures 18, 19, 20, 21:
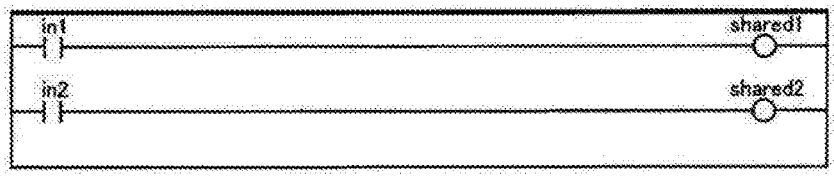
FIG. 18 is a diagram showing an example of a cross reference display screen.
FIG. 19 is a diagram showing an example of a program written in a ladder language.
FIG. 20 is a diagram showing an example of a program written in an ST language.
FIG. 21 is a diagram showing an example of a program written in a V+ language.

In addition, in the present embodiment, as the program written in an IEC language, a program written in a ladder language as shown in FIG. 19 and a program written in an ST language as shown in FIG. 20 are used.

Figure 17:
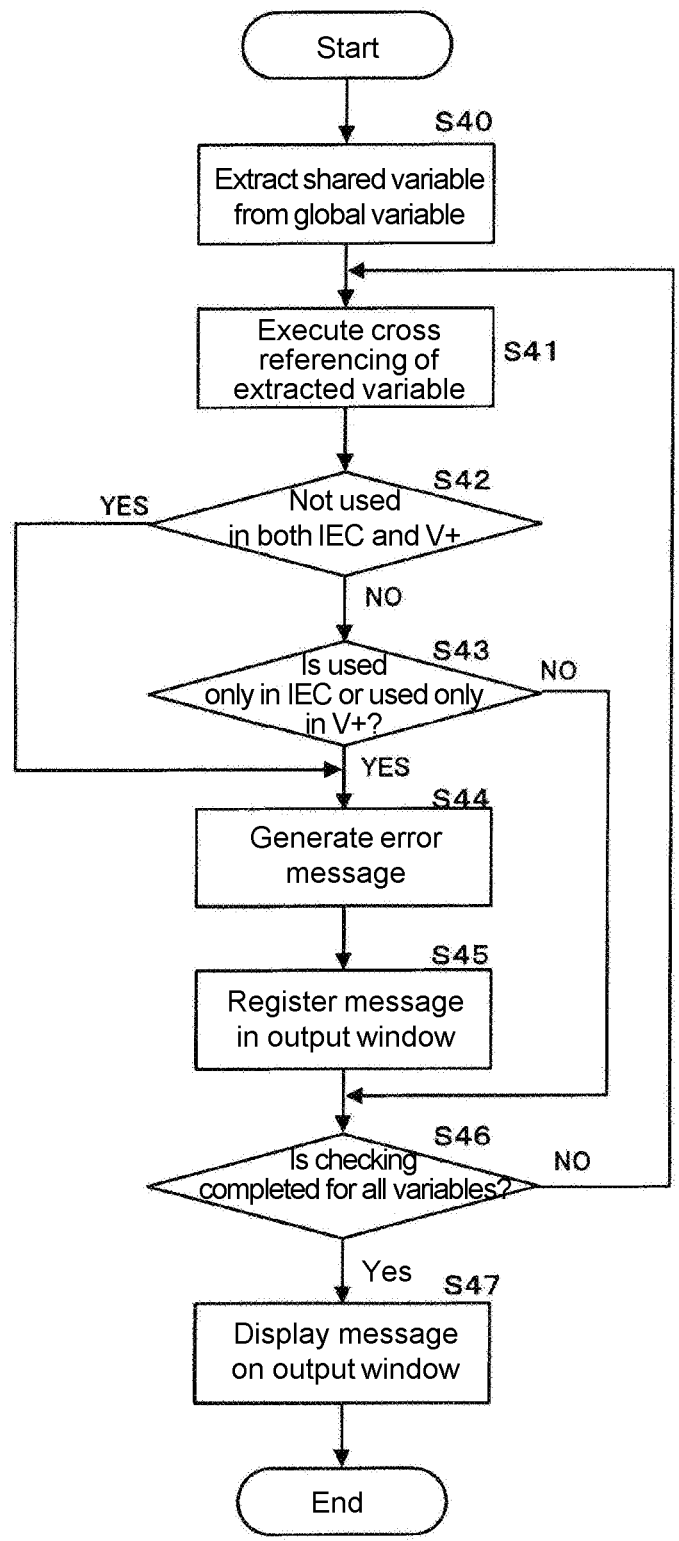
FIG. 17 is a flowchart showing a flow of a shared variable check process.

FIG. 17 is a flowchart showing a flow of a shared variable check process in the present embodiment. When the shared variable check process starts, the cross reference information generating unit 73c extracts a shared variable from a global variable table (step S40). For the global variable table, the same global variable table as the global variable tables TBL1 and TBL2 shown in the first embodiment and the second embodiment is used.

Next, the cross reference information generating unit 73c executes cross referencing between the source code of the program written in a V+ language and the source code of the program written in an IEC language with respect to extracted shared variable (step S41). That is, the cross reference information generating unit 73c refers to a location in which the shared variable is used in the source code of the program written in a V+ language and the source code of the program written in an IEC language, and stores its program name, a step number, an address, a language, a path, and the like as cross reference information in the cross reference information storage unit 74c. When there are a plurality of extracted shared variables, the above cross referencing is sequentially executed on the shared variables.

For example, as shown in FIG. 19, in the program written in a ladder language, shared variables shared1, shared2, in1, and in2 are used. As shown in FIG. 20, in the program written in an ST language, shared variables shared3 and shared4 are used. In addition, as shown in FIG. 21, in the program written in a V+ language, shared variables shared1 and shared4 are used.

The determination unit 73d first executes cross referencing for the shared variable shared1 (step S41), and determines whether the shared variable is used in both the program written in an IEC language and the program written in a V+ language (step S42). Next, it is determined whether the shared variable is used only in the program written in an IEC language or used only in the program written in a V+ language (step S43).

In this example, since the shared variable shared1 is used in the program written in a ladder language and the program written in a V+ language (NO in step S42, NO in step S43), the process advances to step S46. The determination unit 73d determines whether checking is completed for all shared variable (step S46). In this case, since checking has not yet been completed (NO in step S46), the process returns to step S41 again, and next cross referencing is executed for the shared variable shared2 (step S41).

Figure 22:
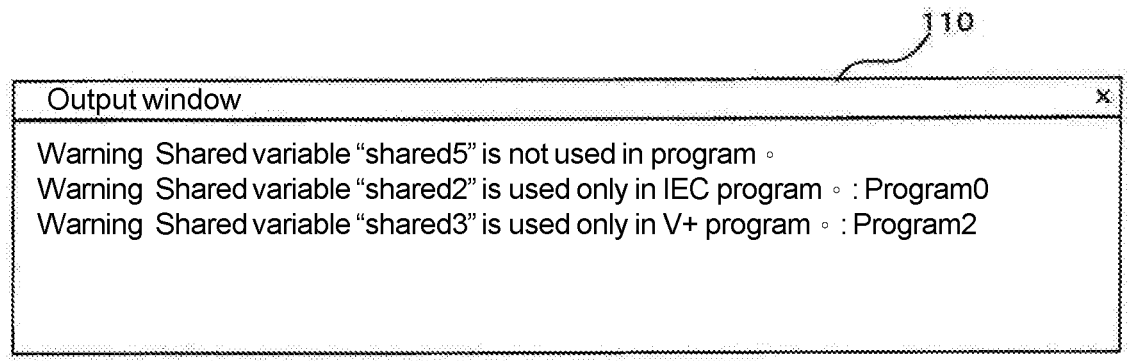
FIG. 22 is a diagram showing an example of an output window.

Since the shared variable shared2 is used only in the program written in a ladder language (NO in step S42, YES in step S43), the determination unit 73d generates an error message (step S44), and the display processing unit 72 registers "warning: the shared variable "shared2" is used only in the IEC program. :Program0" in the output window 110 shown in FIG. 22 (step S45). Here, Program0 indicates a program written in a ladder language shown in FIG. 19.

The determination unit 73d determines whether checking is completed for all shared variables (step S46). In this case, since checking has not yet been completed (NO in step S46), the process returns to step S41 again, and next cross referencing is executed for the shared variable shared3 (step S41).

Since the shared variable shared3 is used only in the program written in an ST language (NO in step S42, YES in step S43), the determination unit 73d generates an error message (step S44), and the display processing unit 72 registers "warning: the shared variable "shared3" is used only in the V+ program. :Program2" in an output window 110 shown in FIG. 22. Here, Program2 indicates a program written in a V+ language shown in FIG. 21.

In the same manner, checking is performed below for all shared variables. When the determination unit 73d determines that check is completed for all shared variables (YES in step S46), the display processing unit 72 displays the error message registered as described above on the output window 110 (step S47), and the determination unit 73d ends checking of the shared variable.

As a result of the above process, finally, the output window 110 shown in FIG. 22 is displayed. The output window 110 may be displayed on the reference information display unit 52c or may be displayed on the program display unit 52a.

In addition, in the present embodiment, in addition to the output window 110, a cross reference display screen 103 shown in FIG. 18 may be displayed. The cross reference display screen 103 is displayed on the reference information display unit 52c.

In FIG. 18, Program0 corresponds to the program written in a ladder language shown in FIG. 19, and Program1 corresponds to the program written in an ST language shown in FIG. 20. In addition, Program2 corresponds to the program written in a V+ language shown in FIG. 21.

As shown in FIG. 18, the shared variable shared1 is used in the program written in a ladder language and the program written in a V+ language. The shared variable shared2 is used only in the program written in a ladder language. The shared variable shared3 is used only in the program written in an ST language.

In addition, the shared variable shared4 is used in the program written in an ST language and the program written in a V+ language. In addition, the shared variable shared5 is not used in all programs. Here, the variables in1 and in2 are not shared variables.

Therefore, in the example shown in FIG. 18, an error message as shown in FIG. 22 is displayed for the shared variables shared2, shared3, and shared5.

As described above, according to the present embodiment, an error message indicating that no shared variable is used in at least one program of the program written in an IEC language and the program written in a V+ language is displayed. As a result, it is possible to check for an omission of implementation of a shared variable, an error of a shared variable name, the presence of a useless shared variable, and the like, and it is possible to smoothly debug the program.

Fourth Embodiment

Next, a fourth embodiment of the disclosure will be described with reference to the appended drawings. A form in which the shared variable check process is performed during the compiling process of the program written in an IEC language has been described in the first embodiment and the second embodiment. In addition, a form in which the shared variable check process is performed after the compiling process is executed has been described in the third embodiment.

In the present embodiment, the source code of the program written in an IEC language and the source code of the program written in a V+ language are displayed on the program display unit 52a, and when a shared variable is selected from the source code, in both the program written in an IEC language and the program written in a V+ language, a location in which the selected shared variable is referred to is displayed as the cross reference information.

Figure 23:
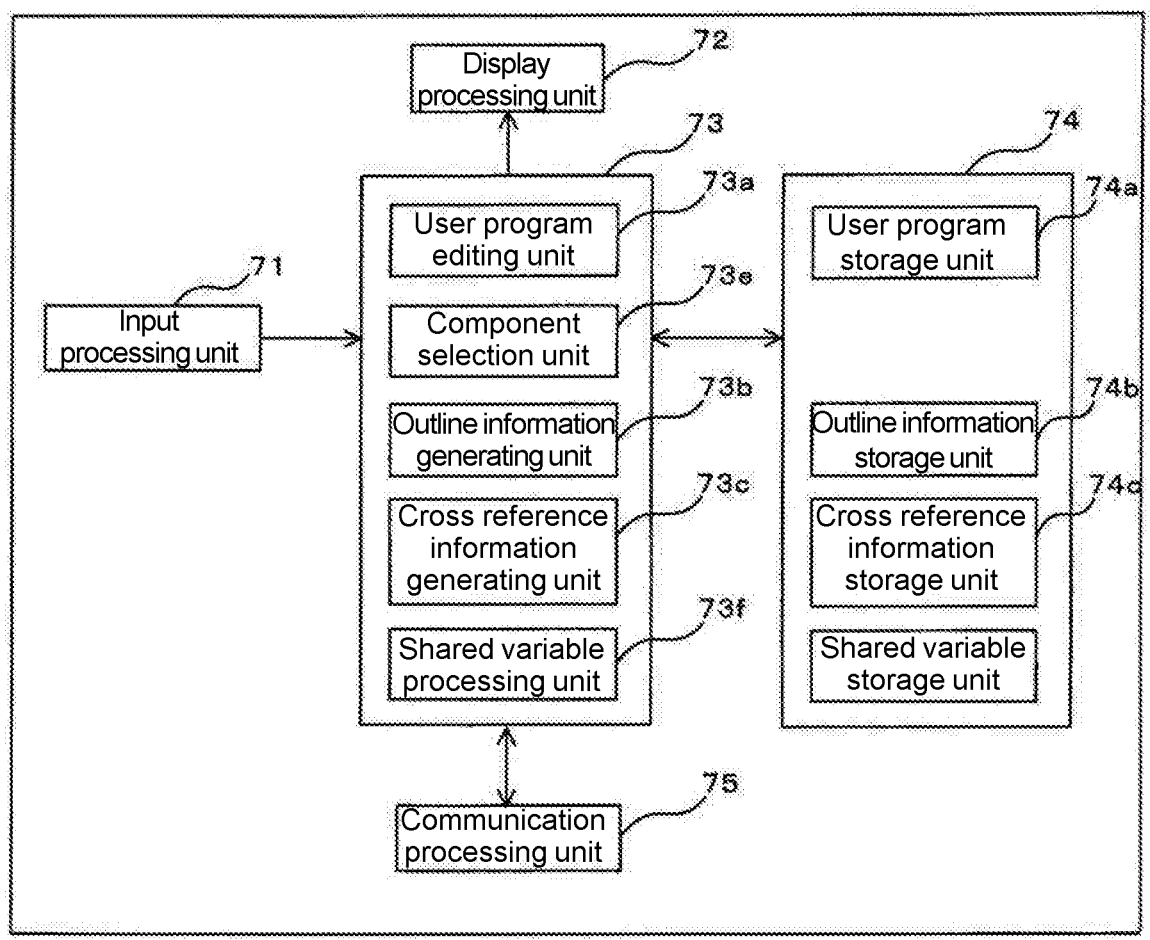
FIG. 23 is a functional block diagram of a development support device in a fourth embodiment.

FIG. 23 is a functional block diagram of the development support device 50 in the present embodiment. This differs from the functional block diagram shown in FIG. 3 in the first embodiment in that the operation unit 73 includes a component selection unit 73e and a shared variable processing unit 73f as a determination unit in the present embodiment. For example, when a variable is clicked by a user in outline information displayed on the outline information display unit 52b, the component selection unit 73e selects the variable as a variable for which the shared variable check process is performed. In addition, when the variable selected by the component selection unit 73e is present in the shared variable reference, the shared variable processing unit 73f determines whether the variable is referred to as a shared variable in the program written in an IEC language and the program written in a V+ language. In the present embodiment, when the shared variable processing unit 73f determines that the selected shared variable is referred to in the program written in an IEC language or the program written in a V+ language, the cross reference information generating unit 73c functioning as a reference unit specifies a location in which the shared variable is used.

FIG. 24 shows an example of the source code of the program written in a V+ language and the source code of the program written in an IEC language displayed on the program display unit 52a in the present embodiment. In FIG. 24, a part indicated by the dotted line is a shared variable. In this example, reqHandClose is a shared variable.

In the program display unit 52a, a source code of any one program may be displayed and source codes of both programs may be displayed. Here, in the present embodiment, an input of the source code of the program written in a V+ language and the source code of the program written in an IEC language has already been completed, and the compiling process of the program written in an IEC language has already been completed.

Figure 25:
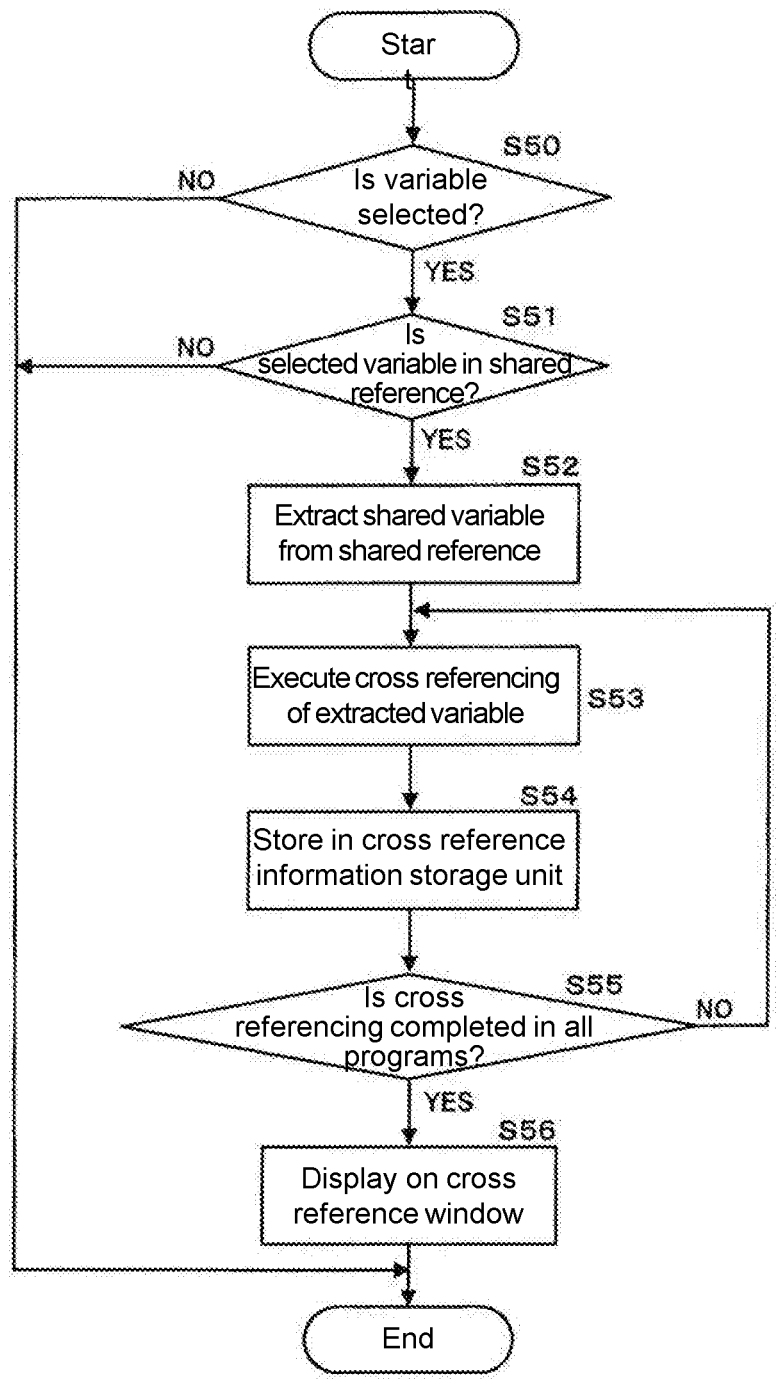
FIG. 25 is a flowchart showing a flow of a shared variable check process.

FIG. 25 is a flowchart showing a flow of a shared variable check process in the present embodiment. The process shown in FIG. 25 is repeatedly executed at predetermined time intervals. When the shared variable check process starts, the shared variable processing unit 73f determines whether a variable is clicked by a user and the variable is selected by the component selection unit 73e (step S50). When it is determined that no variable is selected (NO in step S50), the shared variable processing unit 73f exits the process shown in FIG. 25. However, when it is determined that a variable is selected (YES in step S50), the shared variable processing unit 73f next determines whether the selected variable is present in the shared variable reference (step S51). As in the above embodiment, the shared variable reference in the present embodiment may be a global variable table or a reference different from the global variable table.

When it is determined that the selected variable is not present in the shared variable reference (NO in step S51), the shared variable processing unit 73f exits the process shown in FIG. 25. However, when it is determined that the selected variable is present in the shared variable reference (YES in step S51), the shared variable processing unit 73f extracts the variable from the shared variable reference (step S52).

Next, the shared variable processing unit 73f determines whether the extracted variable is referred to in, for example, the source code of the program written in an IEC language (step S53). When the shared variable processing unit 73f determines that the extracted variable is referred to in the source code of the program written in an IEC language, the cross reference information generating unit 73c refers to a location in which the extracted variable is used in the source code of the program written in an IEC language and stores its program name, a step number, an address, a language, a path, and the like as cross reference information in the cross reference information storage unit 74c (step S54).

Next, the shared variable processing unit 73f determines whether cross referencing for the shared variable is completed in all programs (step S55). In this example, the shared variable processing unit 73f determines that cross referencing for the shared variable has not yet been completed in the source code of the program written in a V+ language (NO in step S55), and the process returns to step S53 again.

The shared variable processing unit 73f determines whether the extracted variable is referred to in the source code of the program written in a V+ language (step S53). When the shared variable processing unit 73f determines that the extracted variable is referred to in the source code of the program written in an V+ language, the cross reference information generating unit 73c refers to a location in which the extracted variable is used in the source code of the program written in an V+ language and stores its program name, a step number, an address, a language, a path, and the like as cross reference information in the cross reference information storage unit 74c (step S54).

The shared variable processing unit 73f determines whether cross referencing for the shared variable is completed in all programs (step S55). In this example, it is determined that cross referencing for the shared variable is completed in all programs (YES in step S55), cross reference information stored in the cross reference information storage unit 74c is displayed on a cross reference window (step S56), and the process shown in FIG. 25 ends.

FIG. 26 shows an example of a cross reference window 200. The cross reference window 200 is displayed on the reference information display unit 52c. The cross reference window 200 shown in FIG. 26 includes a reference target display field 201, a setting item display field 202, an occurrence location display field 203, a detailed information display field 204, a reference display field 205, and the like.

In the reference target display field 201, a name of a program in which cross referencing of a shared variable is performed and a selected shared variable are displayed. "Robot hand control" shown in FIG. 26 indicates a name of the program written in an IEC language. "reqHandClose" is a selected shared variable.

In the setting item display field 202, a shared variable which is a cross reference target is displayed. In the example in FIG. 26, reqHandClose is displayed. In the occurrence location display field 203, a name of a program in which a shared variable displayed on a setting item is referred to is displayed. In this example, robot hand control, and robot control are displayed. "Robot control" indicates a name of a program written in V+ language.

In the detailed information display field 204, in the program displayed in the occurrence location display field 203, a line number in the source code of the program in which the shared variable displayed in the setting item display field 202 is referred to is displayed. In the reference display field 205, a source code in the line number displayed in the detailed information display field 204 is displayed.

As described above, according to the present embodiment, in one program, by simply selecting a shared variable, not only a location in which the shared variable is referred to in the program, but also a location in which the shared variable is referred to in the other program, are displayed in the cross reference window 200.

Therefore, when a user views content displayed in the cross reference window 200, it is possible to easily determine whether the shared variable is properly referred to in all programs. As a result, it is possible to check for an omission of implementation of a shared variable, an error of a shared variable name, the presence of a useless shared variable, and the like, and it is possible to smoothly debug the program.

In the above description, while a form in which a variable is selected from the source code of the program displayed on the program display unit 52a has been described, the disclosure is not limited to such a form. For example, a form in which outline information is displayed on an outline display unit 52b and a variable is selected from outline information can also be applied.

The outline information is information indicating an outline of a configuration of the program written in an IEC language or the program written in a V+ language, and is obtained by extracting predetermined components used in these programs in order from the beginning of the programs.

In this case, in outline information of one program, by simply selecting a shared variable, not only a location in which the shared variable is referred to in the program, but also a location in which the shared variable is referred to in the other program can be displayed in the cross reference window 200.

Therefore, when a user views content displayed in the cross reference window 200, it is possible to easily determine whether the shared variable is properly referred to in all programs. As a result, it is possible to check for an omission of implementation of a shared variable, an error of a shared variable name, the presence of a useless shared variable, and the like, and it is possible to smoothly debug the program.

A form in which only the program written in an ST language is used as the program written in an IEC language has been described in the first embodiment, the second embodiment, and the fourth embodiment. However, in these embodiments, as in the third embodiment, both the program written in an ST language and the program written in a ladder language can be used as the program written in an IEC language.

The above embodiments are examples, and various modifications can be made without departing from the scope of the disclosure. The above plurality of embodiments can be independently implemented, but the embodiments can be combined together. In addition, various features in different embodiments can be independently implemented, but features in different embodiments can be combined together.

What is claimed is:

1. A development support device for developing a plurality of different programming languages that are executed in a control device, the development support device comprising:
   a processor;
   a memory comprising instructions to be executed by the processor,
   wherein the processor is configured to:
      input source code of one programming language and source code of another programming language, and input a shared variable reference comprising a plurality of variables from the source code of one programming language and the source code of the other programming language, wherein the shared variable reference is pre-created at the time the plurality of variables from the source code of the one programming language and the source code of the other programming language were defined;
      perform a check variable process to determine whether a shared variable inputted matches a variable from the source code of the one programming language and a variable from the source code of the other programming language according to the plurality of variables in the shared variable reference; and
      output a message based on the check variable process, wherein the processor is configured to output the message based on the check variable process comprising:
         the processor is configured to output a message indicating that a compilation is successful when the shared variable matches the variable from the source code of the one programming language and the shared variable matches the variable from the source code of the other programming language, and output a message indicating that the compilation has failed when the share variable does not match the variable from the source code of the one programming language or the variable from the source code of the other programming language.

2. The development support device according to claim 1, wherein the processor is configured to pre-create the shared variable reference comprising:
   create a global variable table, register the plurality of variables in the global variable table, and determine whether the shared variable matches the variable from the source code of the one programming language and the shared variable matches the variable from the source code of the other programming language by using the global variable table.

3. The development support device according to claim 1, the processor is further configured to:
   display on a display the source codes of the programming languages and outlines of the source codes;
   select the shared variable displayed on the display unit; and
   specify a location in the source codes in which the shared variable matches a variable in the source codes,
   wherein when the processor selects the shared variable in the source codes or the outlines of the source codes displayed on the display, the processor determines whether the shared variable matches the variable in the source code of the one programming language and the variable in the source code of the other programming language.

4. A development support method for developing a plurality of different programming languages that are executed in a control device, the development support method comprising:
   inputting source code of one programming language and source code of another programming language, and input a shared variable reference comprising a plurality of variables from the source code of the one programming language and the source code of the other programming language, wherein the shared variable reference is pre-created at the time the plurality of variables from the source code of the one programming language and the soure code of the other programming language were defined;
   performing a check variable process to determine whether a shared variable inputted matches a variable from the source code of the one programming language and a variable from the source code of the other programming language according to the plurality of variables in the shared variable reference; and
   outputting a message based on the check variable process, wherein outputting a message based on the check variable process comprising:
      outputting a message indicating that a compilation is successful when the shared variable matches the variable from the source code of the one programming language and the shared variable matches the variable from the source code of the other programming language, and
      outputting a message indicating that the compilation has failed when the share variable does not match the variable from the source code of the one programming language or the variable from the source code of the other programming language.

5. A non-transitory recording medium storing a development support program for a development support device for developing a plurality of different programming languages that are executed in a control device, the program causing a computer to execute:
   inputting source code of one programming language and source code of another programming language, and input a shared variable reference comprising a plurality of variables from the source code of the one programming language and the source code of the other programming language, wherein the shared variable reference is pre-created at the time the plurality of variables from the source code of the one programming language and the source code of the other programming language were defined;

performing a check variable process to determine whether a shared variable inputted matches a variable from the source code of the one programming language and a variable from the source code of the other programming language according to the plurality of variables in the shared variable reference; and outputting a message based on the check variable process, wherein outputting a message based on the check variable process comprising:

outputting a message indicating that compilation is successful when the shared variable matches the variable from the source code of the one programming language and the shared variable matches the variable from the source code of the other programming language, and outputting a message indicating that the compilation has failed when the share variable does not match the variable from the source code of the one programming language or the variable from the source code of the other programming language.

* * * * *